United States Patent [19]
McGregor

[11] 3,827,076
[45] July 30, 1974

[54] COLOR TV APPARATUS AND METHOD

[76] Inventor: John L. McGregor, 827 S. Glenwood, Springfield, Ill. 62704

[22] Filed: Apr. 24, 1971

[21] Appl. No.: 134,030

Related U.S. Application Data

[63] Continuation of Ser. No. 687,274, Dec. 1, 1967, abandoned.

[52] U.S. Cl. .......... 358/58
[51] Int. Cl. .......... H04n 9/22
[58] Field of Search.... 178/5.2, 5.4, 5.4 CF, 5.4 ST; 350/313, 315, 317

[56] References Cited

UNITED STATES PATENTS

| | | | |
|---|---|---|---|
| 2,452,293 | 10/1948 | DeForest | 178/5.4 CF |
| 2,535,530 | 12/1950 | Clark et al. | 178/5.4 CF |
| 2,538,071 | 1/1951 | Young | 178/5.4 |
| 2,602,854 | 7/1952 | Bedford | 350/313 |
| 2,687,450 | 8/1954 | Morrison et al. | 178/5.4 CF |
| 2,728,814 | 12/1955 | Berger | 178/5.4 CF |
| 2,846,498 | 8/1958 | Toulon | 350/313 |
| 3,075,432 | 1/1963 | Myers | 178/5.4 ST |

*Primary Examiner*—Richard Murray
*Attorney, Agent, or Firm*—Paul H. Gallagher

[57] ABSTRACT

Producing a pattern of stripes of color weighted information on the TV picture screen, utilizing a color filter in front of picture screen having color bands in register with the stripes and moving the pattern of stripes and the color filter together across the picture screen to complete a sequence.

21 Claims, 17 Drawing Figures

L - LEFT
C - CENTER
R - RIGHT

Inventor:
John L. McGregor
By Paul H. Gallagher
Atty.

Inventor
John L. Mc Gregor
By Paul H. Gallagher
Atty.

Inventor:
John L. McGregor
By Paul H. Gallagher
Atty.

Inventor:
John L. McGregor
By: Paul H. Gallagher
Atty.

Inventor
John L. McGregor
By Paul K. Gallagher
Atty.

COLOR TV APPARATUS AND METHOD

This application is a continuation of application Ser. No. 687,274, filed Dec. 1, 1967, now abandoned.

The present invention relates to color TV.

A broad object of the invention is to provide novel apparatus and method for use on a modification of a monochrome TV receiving set for producing a color picture from the color signals broadcast from the transmitter station and normally reproduced in black and white in such set.

Another object is to provide apparatus and method of the character just referred to adapted for use with and having the least complexity when used with the NTSC signal.

An additional object is to provide apparatus of the foregoing character which is in large part mechanical in nature, although incorporating electrical features, and which is consequently of extremely simple nature and correspondingly inexpensive, and is less likely to fail in operation.

Still another object is to provide apparatus of the foregoing character controlled at the receiving set independently of and without any control synchronization or registration with the broadcasting station, whereby to provide additional features of simplicity with attendant advantages.

The apparatus of the invention utilizes a color filter disposed in front of the usual picture screen. The color filter includes areas of the different colors utilized in transmitting, and the apparatus includes means for presenting color weighted information on the picture screen in association with the color areas in the color filter, and thereby producing a presentation of the colors by the color filter in such a manner as to present an appearance of simultaneous and full distribution of all of the colors throughout the entire area of the picture screen.

A still further object is to provide apparatus of the character just referred to in which all of the colors are reproduced simultaneously in a plurality of areas each smaller than the total area of the picture screen, whereby to eliminate the presentation of a single color distributed throughout the picture screen, and interchange of the colors, as has been done heretofore, with the advantage that all the different colors appear to be simultaneously distributed throughout the entire area of the picture screen as stated.

An additional object is to provide apparatus and method of the character just referred to incorporating the feature of persistence of vision whereby to produce the appearance of constant presentation of all the colors distributed uniformly throughout the area of the picture screen.

An additional and more specific object is to provide apparatus and method of the foregoing character in which the apparent simultaneous and full distribution of all the colors is produced at least in part by moving the color filter across the picture screen.

A great advantage resides in utilizing color areas in the color filter each of which is less than the total area of the picture screen, namely, the color filter may be moved at a much slower speed than has been possible heretofore, enabling such a color filter in the form of a belt to be used, which results in a correspondingly less expensive construction and quieter operation.

A still further and more specific object is to provide apparatus and method of the kind just immediately referred to in which the color filter includes a breakdown and distribution of the different colors in such an arrangement as to minimize the parallax effect which is an unavoidable result of positioning a color filter in front of the picture screen because of the thickness of the picture tube element which encloses the picture screen, this element being of substantial thickness and defining a corresponding substantial spacing between the color filter and picture screen.

A more specific object is to provide apparatus and method of the foregoing character in which the change or transition between colors in the color filter is of gradual effect whereby to eliminate all sharp and highly defined lines between the colors.

Still another object is to provide apparatus of the character referred to in which the different colors in the color filter are arranged in progressive degrees of intensity and opacity, this variation or gradation eliminating the necessity for great accuracy in synchronism or registration between the color areas in the color filter and color weighted information on the picture screen.

A great advantage of the construction referred to in the two preceding paragraphs just immediately referred to, is that the gradual transition between the colors in the color filter is correlated with a similar transition between the colors represented in the color weighted information on the picture screen, whereby to minimize possible apparent non-registration in angular viewing.

Another object is to provide apparatus and method of the foregoing character in which there is no requirement for great accuracy in registration as between the mechanical movement of the color filter and the means for displacing the pattern of color weighted information, resulting in greater simplicity in the apparatus and much less likelihood of such disarrangement as would result in a defective picture.

Another and more specific object is to provide apparatus and method of the character referred to in which there is only a requirement for a similar rate and not specific phase angle relationship synchronization as between the moving color filter and the vertical scan of the picture on the picture screen.

Still another object is to provide a sequential presentation of the colors in such a manner as to blend them into an apparent constant presentation of all the colors distributed entirely throughout the picture screen.

Other objects and advantages of the invention will appear from the following detail description taken in conjunction with the accompanying drawings wherein.

Figure 1:
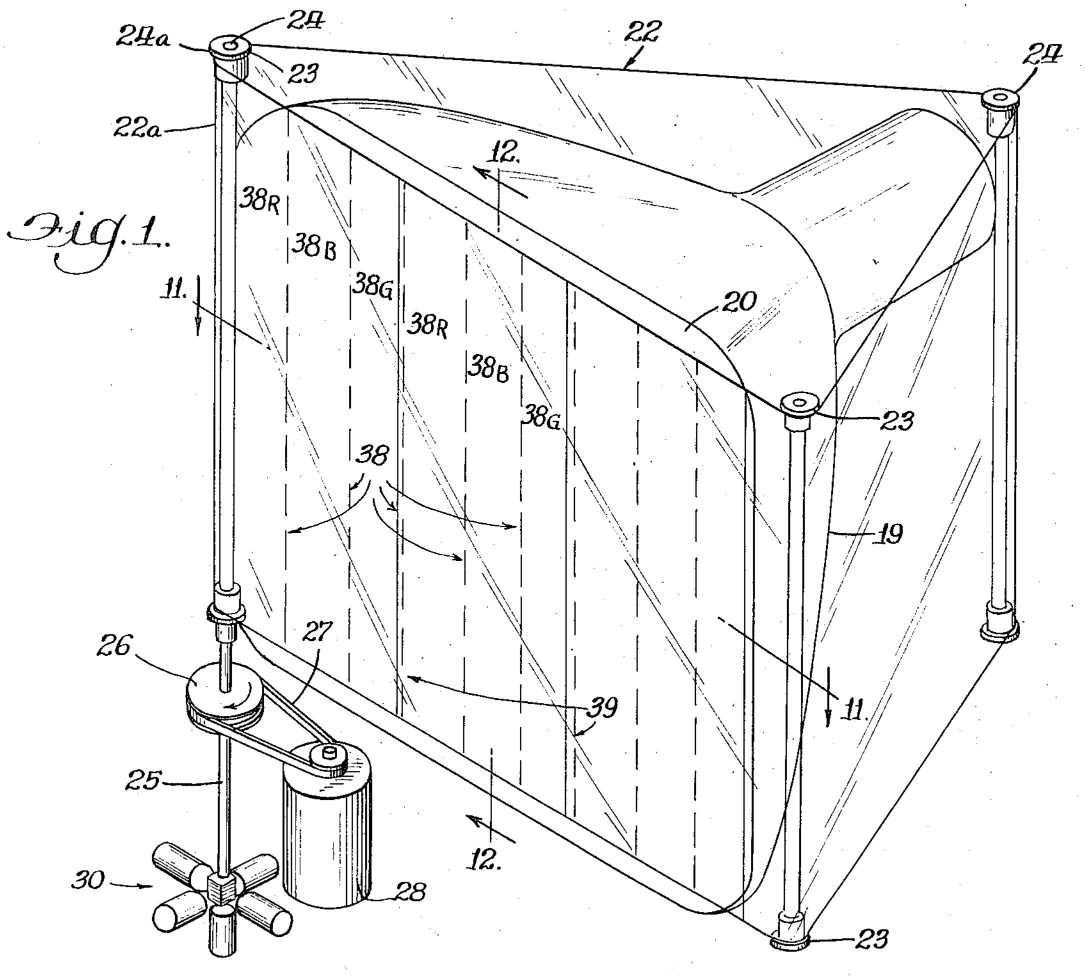
FIG. 1 is a perspective view of the principal components of the apparatus of the present invention.

Referring first to FIG. 1, a TV picture tube, or image reproducer 19, is shown, of known character having a front element 20 defining a picture screen 21 (see FIGS. 9, 11 and 12) on its inner surface, and mounted in a suitable chassis or cabinet. The details of this picture tube and chassis need not be entered into, but they are of such character as to receive NTSC or other color signals and to reproduce them on the picture screen 21.

Surrounding the picture tube 19 is a color filter, or filter screen, 22 in a form of continuous web or belt having one run 22*a* moving across in front of the picture screen. The web or belt 22 is trained on and supported by a plurality of flanged wheels 23 or rollers or shafts 24 here representing the various kinds of elements that may support the web or belt and move it in a continuous path. One of the rollers 24, designated 24*a*, is utilized for a driving element and as such has a lower extension shaft element 25 having a pulley 26 thereon driven through a belt 27 by a motor 28. On the remote end of the extension 25 is a phase shifter 30 to be described hereinbelow.

The drive motor 28 operates to rotate the roller 24*a* in a selected direction which may be clockwise as viewed downwardly in FIG. 1, moving the front run 22*a* of the web or belt from right to left. The rotation of the shaft element 25 also operates the phase shifter 30 in synchronism with the movement of the belt 22. The phase shifter, as explained fully hereinbelow, in conjunction with a crystal circuit, produces or sets up a pattern of color weighted information in the form of vertical stripes or lines on the picture screen which move across the screen, and registration is established between color bands on the belt or color filter and the stripes on the picture screen so that when the observer views the picture through the color filter, the stripes of color weighted information on the picture screen are in line with and viewed through the corresponding color bands in the color filter. Various and refined effects are produced by this arrangement as discussed more fully hereinbelow, but consideration at the present is given to the details of the belt or color filter 22.

Figure 3:
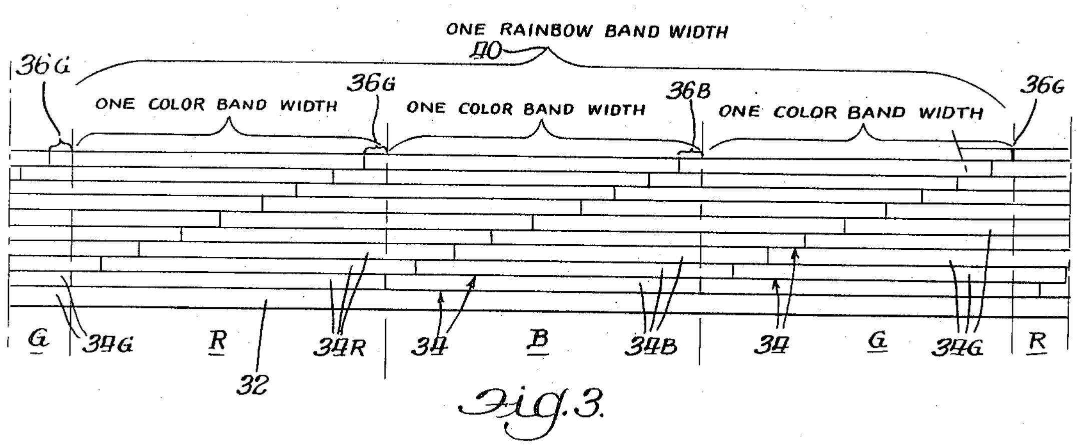
FIG. 3 is a fragmentary edge view, in exaggerated form, of the color filter.
Figure 4:
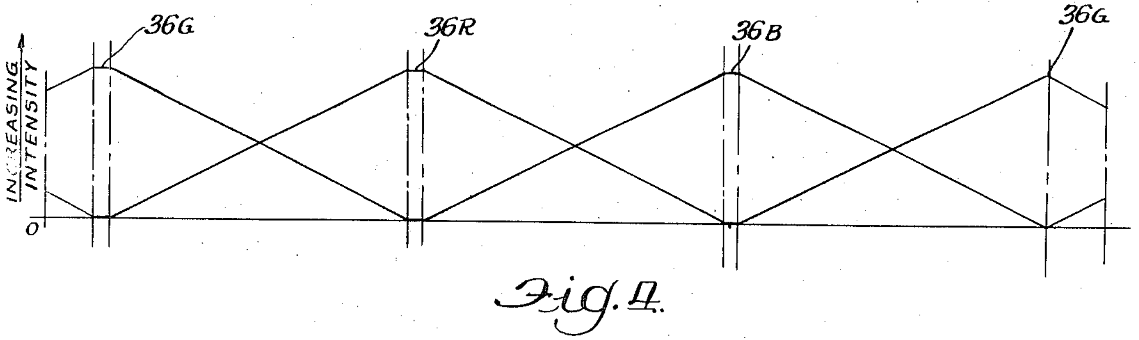
FIG. 4 is a diagrammatic representation of the intensity of the colors in the color filter of FIG. 3.

The color filter 22, in its specific construction as well as its association with other elements of the apparatus, is a principal feature of the invention. Attention is directed now to FIGS. 3 and 4 for the details of construction of the color filter. This color filter includes a continuous base element 32, highly transparent and clear. A polyester film put out by DuPont and known as "Mylar" for example, or equivalent material of suitable kind, may be utilized for this purpose. Deposited on and carried by the base element 32 are a plurality of segments or leaves 34 of the respective colors utilized in the color weighted information in the set, these colors being red, blue, and green, the individual segments being identified as 34R, 34B, and 34G, respectively. These segments are also highly transparent, but colored or tinted of the respective color, each individually being of fractional or low intensity color, but they are laminated or stacked to a substantial depth, as will be referred to again, resulting in corresponding high intensity of color when viewed through the entire laminated stack which contains nine, or 10 if desired, layers or laminations.

These segments or leaves extend transversely the full width of the web or belt, vertically as viewed in FIG. 1, and are disposed side by side longitudinally of the belt, or horizontally as viewed in FIG. 1. The segments or leaves are of the respective colors in side-by-side progression and butt each other without substantial gaps or overlaps therebetween in each layer, and the segments or leaves in the successive layers or laminations are offset or staggered progressively at a certain predetermined interval or increment as will be referred to again. In the present instance, the laminations are offset laterally of each other, or linearly of the endless direction of the web or belt, one-ninth of their width so that the nine laminations when in stacked form, form nearly a complete change of color from one side of the respective segments to the other in direction linearly of the web or belt. The intensity of each segment, as noted above, is slight, but the intensity is increased by the laminations so that the total laminations utilized form a peak of intensity for each of the separate colors. These peaks are represented in FIGS. 3 and 4 at 36R for red, 36B for blue, and 36G for green. These segments individually form what are termed color bands 38, individually identified at 38R, 38B, and 38G (FIGS. 1–4) for the respective colors, and three of these color bands together form what is designated a rainbow band 39. Thus beginning for example at the left end of the representation of FIG. 3, the color band 38R is initially only slightly red (and mostly green) and progresses, to the right, to a deeper red while diminishing in green to the point 36R where the intensity of the red is a maximum and the color is only red. Progressing further, through the color band 38B, the red intensity decreases while the blue intensity increases to a maximum intensity blue, without any other color, at the point 36B; similarly progressing further to the right in the color band 38G, the green picks up and progresses from a point of minimum intensity to a point of maximum intensity at the point 36G, while the blue correspondingly diminishes and disappears.

When the stack consists of nine layers, the peak is of substantial width, reaching one-ninth of the dimension of the color band linearly of the belt, as represented at the three left-most peaks in FIGS. 3 and 4. However, when ten layers are utilized, as shown at the far right of FIG. 3, the peak is essentially without dimension linearly of the belt, i.e., it is of only line width. Preferably nine layers are utilized, but 10 are satisfactory. Means of obscuring the discrete edge of segments or leaves may be used where they do not interfere with construction features of the filter belt such as feathering, serrations, waver or blurring.

The specific means of forming the web or belt 22 (color filter) may be as desired, the technique for forming such being known, such as by utilizing a fusion process in which the base element and the segments or leaves are all fused into a unitary and solid, and effectively integral, element. A further common means is by printing repeated layers of lightly colored gelatin film on a thin flexible transparent carrier. The thickness of the web or belt is highly exaggerated in FIG. 3 and in fact the actual thickness of the final product is very minor.

The transverse dimensions of the color bands and rainbow bands will be referred to again hereinbelow, but it may be mentioned in passing that they are dimensioned in the present instance for providing nine color bands and three rainbow bands across the picture screen, although this number is not critical. It will be understood that the various dimensions and proportions may be varied according to the size of the picture tube being utilized, as well as other factors.

Another principal feature of the invention is the progression of the field across the picture tube, i.e., the vertical color bands 38 of the color filter 22 are moved horizontally across the tube, and the vertical color stripes 40 formed on the picture screen (see FIG. 9) are also caused to move across the screen, in register with the color bands on the color filter. The stripes on the picture screen are produced with the NTSC signal or other signal reconstituted to like form by a color bar generator of a type presently known and represented diagrammatically in the circuit of FIG. 8. In this circuit is a transformer 41 tuned to approximately 3.58 Mc. (3.579545 Mc in the case of an NTSC signal) and the bursts thereof are applied to a crystal 42 of about 3.5323 Mc (3.532295 in the case of an NTSC signal) through a condenser 43. This frequency is slightly different from the frequency of the NTSC or other signal and produces a beat therewith so as to present color weighted information in the form of vertical stripes or lines of those colors on the picture screen. Where the color information is not phase-angle related, other means of selecting colors sequentially to form a pattern such as a high speed phase angle changer like a continuous commutator device, may be utilized. In the use of the present apparatus, the pattern of the color stripes is moved across the screen, and moved in register or synchronism with the movement of the color filter 22, and moreover, at a controlled speed, as described in detail hereinbelow. The specific electronic devices described are referred to aspects of the NTSC signal. This probably results in the least complexity in the receiver circuits. Other signals may be used by peculiar adaptations of the equipment components. What is required of all signals is that all color information be available at any instant so that the color information can be selected to correspond to the color filter and can be selected by the local synchronizing system. Some sequential signals may require local reconstitution with delay lines as for use with three gun receivers.

Figure 5:
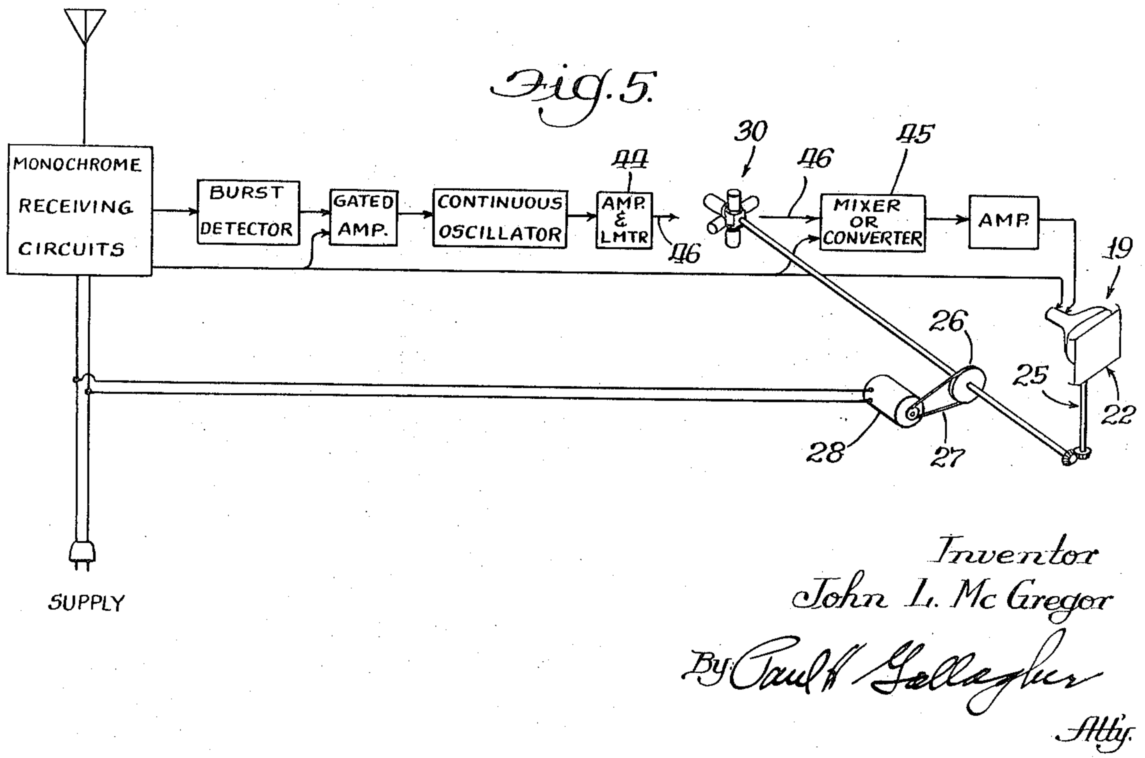
FIG. 5 is a diagram, principally in block form, of the circuit employed in the apparatus and including certain operating components in pictorial form.

The means for causing the color weighted information stripes on the picture screen to progress or march across the screen includes the continuous phase shifter 30 which in one form of the apparatus is interposed (FIG. 5) between the amplifier and limiter 44 and the mixer or convertor 45, in a conductor 46. The phase shifter 30 includes (FIG. 6) a variable phase angle induction rotor coupler 48 which in turn includes a transformer coil 50 surrounded by a loop coil 52. Positioned on the axis of the shaft extension 24, and beyond the coupler 48, is another transformer coil 54. The coupler 48 is disposed in an area within the inner ends of a series of radially arranged field coils 56, 58, 60 and 62. These latter field coils are directly connected in the conductor 46 of FIG. 5, each pair of opposed coils 56, 60 and 58, 62 being arranged in series. A capacitor 68 is interposed in series with the coils 58 and 62. A jumper 70 may be arranged in shunt of one coil of each pair, namely coils 60 and 62. The coupler 48 as represented in the circuit at FIG. 6 is displaced from its working position, its actual position being as shown in the mechanical illustration at the right of that figure.

Upon operation of the drive motor 28 for driving the web or belt 22 (color filter), the phase shifter 30 is also operated, the coupler 48 rotating of course continuously in the same direction, sweeping through 360 degrees. It effectively reverses the connections between the coils 56, 58, 60, 62 through the same or opposite polarity, respectively, and the capacitor 68 changes the phase angle 90 degrees. The phase shifter therefore controls the phase angle of the burst signal or the oscillator output so that the color information at the start of each scanning line is caused to progress in color values in phase with the color bands on the color filter, the burst signal being sent by the TV broadcasting station, picked up off the back porch and used to trigger the oscillator so that any drift is continuously corrected. Each spot on the picture screen follows a color sequence in the production of the color weighted information, but as a result of movement of the filter and color-weighted information in register, in conjunction with the stroboscopic field illumination of the image reproducer, each line, under the control of the phase shifter, begins with the color of the stripe on the screen present at that place at that time. The spots may represent the primary colors, or colors in between the primary colors, and they may start at different colors in the sequence. The sequence is completed to add to white in three illuminations. The width of the color stripes is determined by the difference in frequency between the crystal and the TV signal, and as is understood the stripes go from color peak to color peak with lesser intensities and mixtures therebetween.

Figures 6, 7, 8:
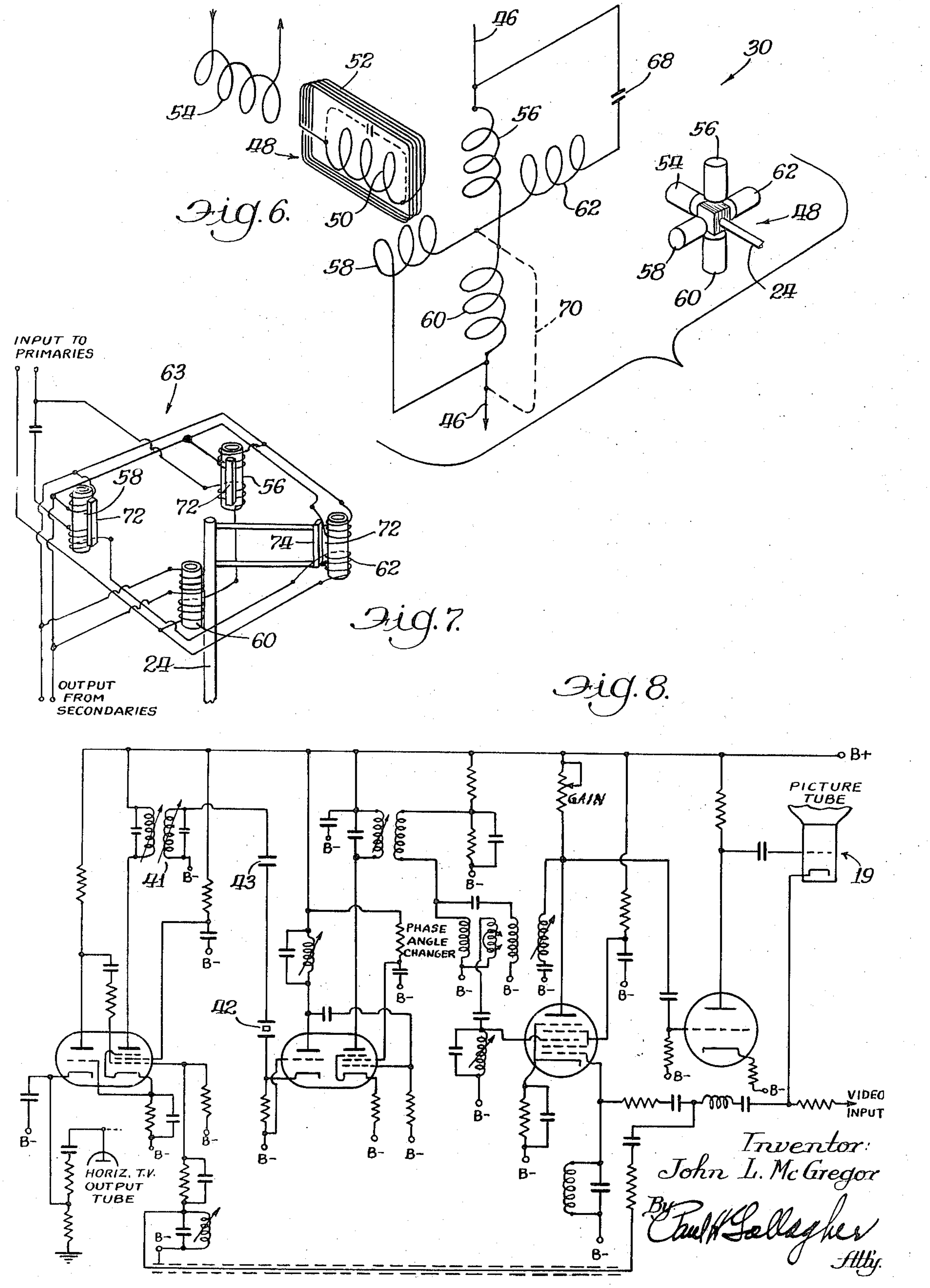
FIG. 6 is a diagram of certain of the elements of a phase shifter utilized in the apparatus, and includes a mechanical representation of the phase shifter.
FIG. 7 is a diagrammatic illustration of a modified form of phase shifter.
FIG. 8 is a diagram of a typical circuit for producing and moving a color bar pattern.

FIG. 7 shows a modified form of phase shifter 63, this being a saturable reactor form. Each of the coils is associated with a powdered iron core saturated by a permanent magnet 72, these permanent magnets being neutralized by another permanent magnet 74 mounted on the shaft extension 24 and moving successively into association with the magnets 72 and neutralizing them.

When the saturation is relieved or neutralized the primary and secondary of the transformer are coupled and the 3.53 Mc signal can be induced from one to the other.

The phase shifter may be formed in any manner which will cause the pattern of color information to be shifted in register with the color filter movement. Such a device could consist of rotating rheostats, potentiometers or multiple contact transformers controlling a multiplicity of gates regulating various phase outputs so as to effectively result in an apparent continuous phase angle transition. Other mechanically controlled phase angle shifters may also be utilized.

The continuous phase shifter 30 (or 63) continuously varies the initial color phase angle and in that specific manner causes the pattern of vertical stripes of color weighted information to move across the picture screen, as stated. The rate of such movement is determined by the rate of movement of the phase shifter and thus is synchronized with the movement of the color filter, since the phase shifter and color filter are driven by the common roller or shaft **24*a* which in turn is driven by the motor 28. Additionally, the rate of movement is determined by the need to have a sequence completed and may be varied by changing the number of rainbow bands 39 as desired. The color bands 38** are pre-positioned in register with the corresponding color stripes on the picture screen and of course remain in register therewith in moving across the screen. Since a change of the rate of movement from an absolute multiple of rainbow and color band widths in an even multiple of field presentations only causes an overemphasis of colors at the spectrum ends, the rate can change slightly without being evident.

Figure 2:
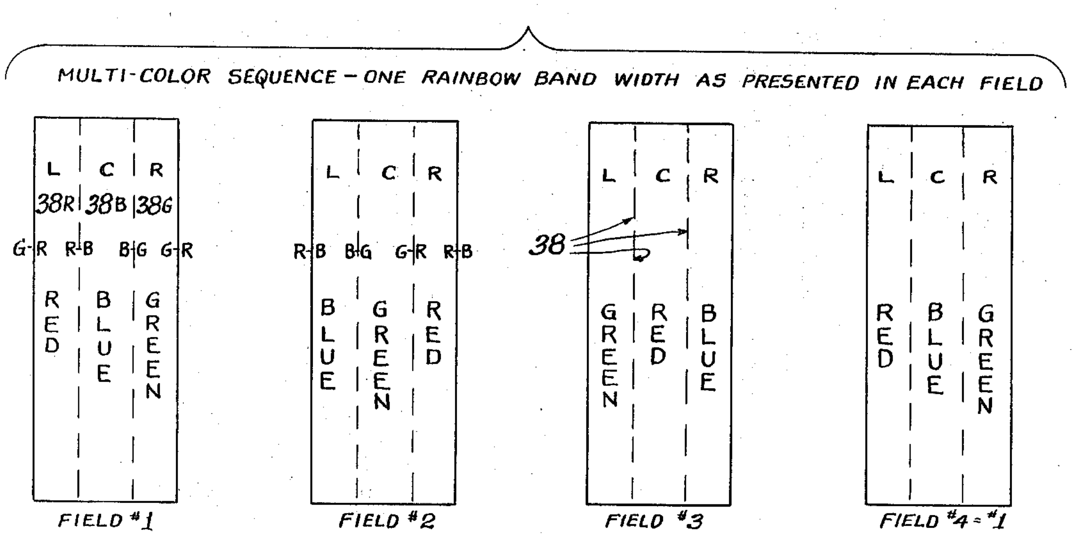
FIG. 2 is a diagrammatic representation of the successive display fields produced on the picture screen.

FIG. 2 shows a change of the fields of presentation, field No. 1 at the left, constituting a rainbow band as positioned in FIG. 1, i.e., the colors red, blue, and green being presented from left to right; field No. 2 is in the same position on the picture screen but with the color bands shifted one band width within the same rainbow band width area of field No. 1, so that the color bands are in the order of blue, green, and red; field No. 3 represents the next step, - in the same position but the color bands again shifted one band width, so that the colors are in the order green, red, blue; finally field No. 4 is the same as field No. 1, showing a complete cycle in the progress of the fields.

A sequential progression of colors is established and because of the presence of all of the colors in different color phase angles in the color filter over the picture tube, and particularly the presence of the same color in a plurality of different areas simultaneously, persistence of vision of the colors is utilized for establishing what appears to be static presence of all of the colors.

Figure 9:
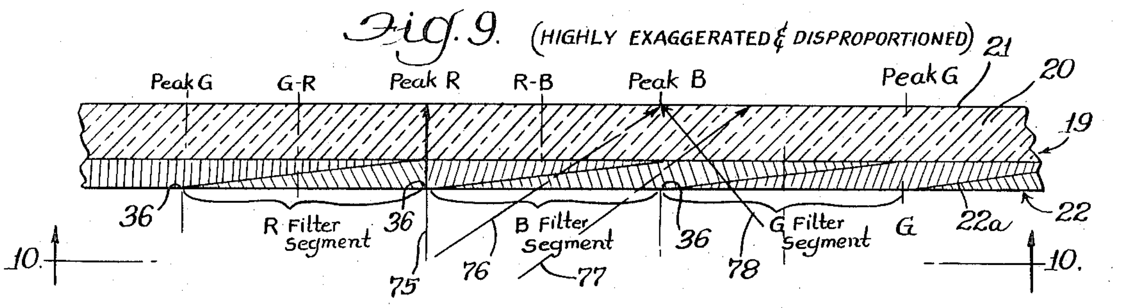
FIG. 9 is a fragmentary large scale sectional view, exaggerated, oriented according to FIG. 11, relating to parallax condition as between the color filter and picture screen.
Figure 10:
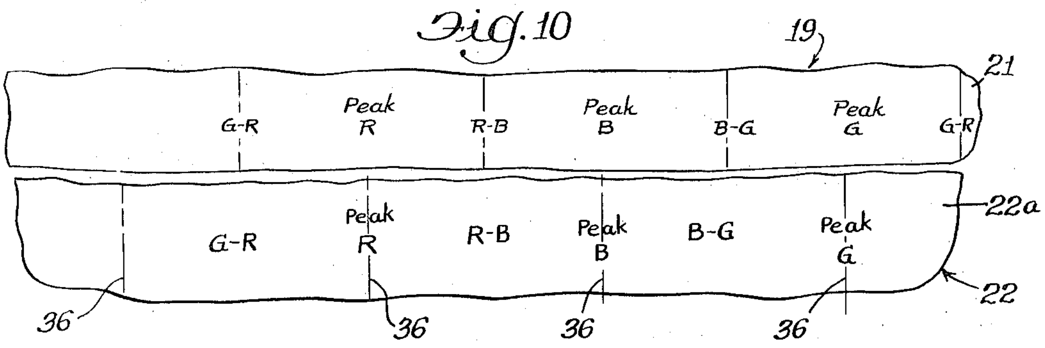
FIG. 10 is a face view, taken at line 10—10 of FIG. 9.

The overlapping or staggered arrangement of the segments 34 on the color filter builds up a pyramidal distribution of intensities of the colors and a transition from one color to the next which provides blending of the colors and eliminates noticeable sharp lines therebetween. Nevertheless, peak intensity of the various colors is provided as stated above. A typical arrangement of color bands on the color filter and the stripes of color weighted information on the picture screen is represented in FIGS. 9 and 10.

The overlapping and staggered arrangement of the color segments 34 greatly reduces the objectionable effects of parallax. Referring to FIG. 9, a perpendicular line of sight as represented by the arrow 75 passes through the peak red coloring of the color filter to the peak of the red stripe on the picture screen. This is, however, a simple situation but a great advantage of the arrangement is exemplified in the case of viewing the picture at an angle such as represented by the arrow 76. In such a case, the observer would be viewing the blue stripe of the picture screen at the peak thereof but the line of sight passes through segments of the filter of different colors, including of course the color of the stripe in question (blue) on the picture screen. A third situation is indicated by the arrow 77 representing a line of sight through a full color portion of the filter to a mixed color portion on the picture screen. Still another condition is indicated by the arrow 78, representing an oblique angle of view but from the opposite side; in this case, although it does not pass through a full color portion of the filter, it always passes through a portion thereof of the same color as the target color on the picture screen, and principally of that color. It will be appreciated that the arrows 76, 77, and 78 indicate extreme angles and as a practical matter such a situation would not exist, oblique lines of sight being much nearer the perpendicular. In such cases although the color on the picture screen that is observed, is so observed through more than one color in the color filter, the true color nevertheless responds to a substantial degree and the apparatus entirely eliminates abrupt change in color as would be produced where the colors in the color filter were separated by sharp lines. The gradual change in color on both the color filter and the picture screen provides a great advantage in eliminating full contrast in colors,—in the worst condition, a full color on the picture screen may be viewed through a mixed color portion of the filter, or a mixed color portion on the picture screen may be viewed through a full color portion of the filter.

Although the segments 34 in the color filter are shown offset one-ninth of their width, this exact amount of offsetting is not critical and they may be offset a greater or lesser amount; if for example they should be offset a lesser amount, instead of points 36 of peak intensity, there would be areas of substantial width of maximum intensity.

Figure 11:
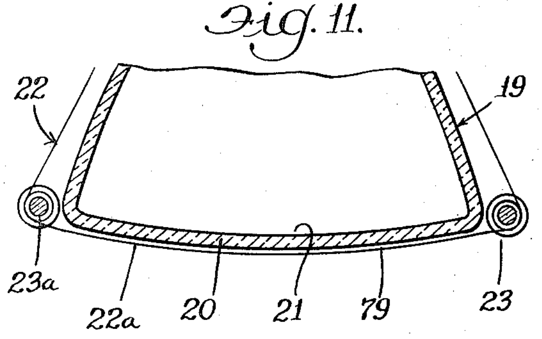
FIG. 11 is a diagrammatic representation oriented according to line 11—11 of FIG. 1, showing certain features of the association between the color filter and the picture tube.
Figure 12:
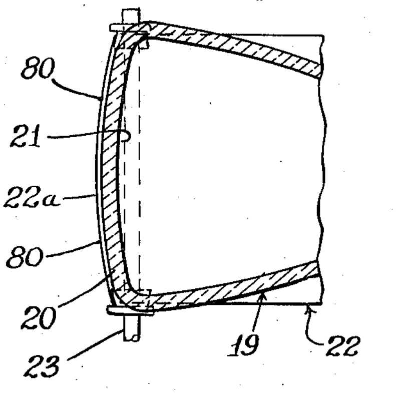
FIG. 12 is a diagrammatic illustration oriented according to line 12—12 of FIG. 1, also showing certain features of relationship between the color filter and the picture tube.

The front element 20 of the picture tube is usually curved in both directions as represented in FIGS. 11 and 12. The rollers or flanged wheels 23 may be positioned so that the front run **22*a* of the color filter lies directly on the element 20 or be spaced therefrom as indicated at 79 in FIG. 11,** although a slight amount, this spacing being caused by the centrifugal force of the color filter or belt in its movement.

In order to accommodate the curvature of the front element 20 of the picture tube in a vertical plane (FIG. 12) the belt 22 forming the color filter may be bellied or barrelled out at the central portions so that it follows the vertical curvature. In this case the belt may be supported only at its top and bottom edges on the rollers or flanged wheels 23 and again due to centrifugal force the central portion flies out from the front surface of the picture tube. In this case, in order to compensate for any variation in registration between the color bands in the color filter and the peak color intensity lines on the picture screen, the central point in the upper and lower quartiles may be made to so register, as indicated at the points 80, to produce the highest degree of registration throughout the full vertical extent of the screen and by a normal distortion along the center line reduce the distortion during oblique viewing.

Figure 13:
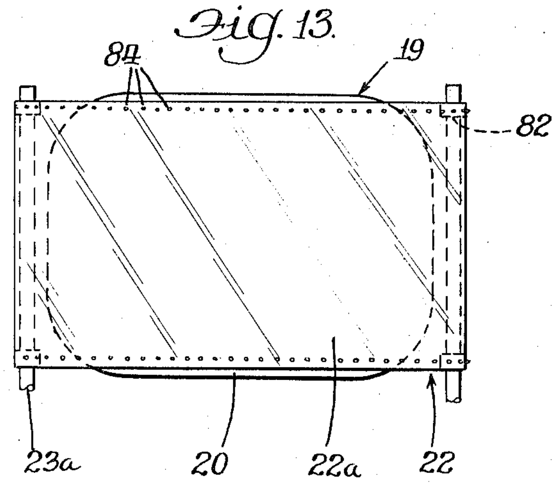
FIG. 13 is a front view of the picture tube and color filter showing a slightly modified form of drive for the color filter.

If desired, the rollers or flanged wheels 23 may be provided with sprockets 82 (FIG. 13) having teeth working in apertures 84 in the upper and/or lower side marginal edges of the belt, this for the purpose of preventing slipping, and facilitating proper registration of the color filter with the stripes on the picture screen, through the drive shaft 24*a*.

Figure 15:
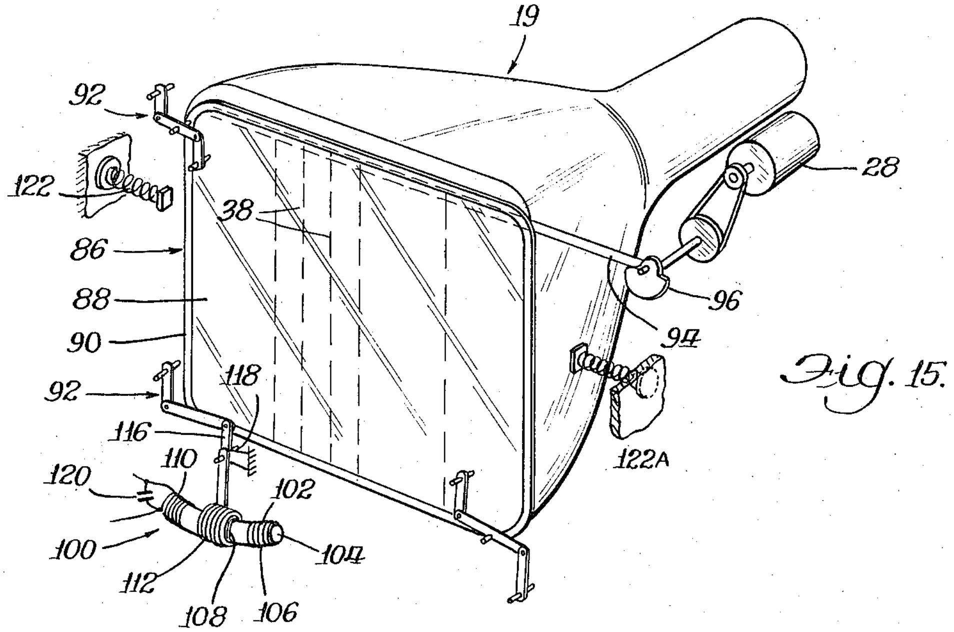
FIG. 15 is a perspective view of a modified form of device.

FIG. 15 shows another form of color filter and related elements. In this case the picture tube 19 is shown, and a color filter 86 in the form of a panel including a web or film 88 mounted in a rigid frame 90. The web or film 88 is of the same character as the color filter 22, having rainbow bands 39 (four) each made up of color bands 38 (three). The color filter is mounted in overlying relation to the picture screen in the picture tube, and for oscillating movement in substantially straight or horizontal directions, being supported on linkage mountings 92 of known kind for effecting that kind of movement in response to driving by a pitman 94 in turn driven by a counter-weighted crank 96. The crank is driven by the motor 28.

A phase shifter 100 is incorporated in this form, having a stationary member 102 including an arcuate powdered iron core 104, and spaced primary transformer coils 106, 108 and 110. Surrounding the stationary member is a movable secondary coil 112 mounted on an arm 114 conveniently forming an extension of an arm 116 forming part of one of the linkage mountings 92, and swinging about a pivot element 118 defining the axis of the stationary member 102.

The phase shifter operates similarly to the phase shifter 30 of FIG. 6, being synchronized with the movements of the color filter 86. In the present instance the end coils 106 and 110 serve the function of one pair of opposed coils of FIG. 6, e.g., 56 and 60, while the middle coil 108 serves the function of the other two, e.g., 58 and 62, except the coil 108 being used twice the same does not reverse polarity 180° as do 58 and 62. A capacitor 120 also is provided, across coil 108 corresponding to the capacitor 68 of FIG. 6.

In the operation of the present device the pattern of vertical stripes of color weighted information moves on the picture screen in synchronism with the color filter, and may be oscillatory. In such case, the color filter moves in each direction at substantially the same rate of speed as the pattern and thereby maintains registration therewith. Because the crank radius that would give a proper blend of the other two colors when one color appears in the stroboscopic illumination at left or right dead center is different from the crank radius to give the three colors exactly when one appears in the stroboscopic illumination at top or bottom dead center it may be necessary to apply a slight correction to extreme left and right movement of about one sixteenth of the crank radius.

If desired, springs 122 and 122A may be utilized, retarding the movement of the color filter in advancing direction, and increasing its rate of movement in returning or retracting direction at each end of a stroke the motor 28 reacting correspondingly thereto. In this case the returning or retracting time is substantially less than the advancing time at each end of a cycle of movement of the color filter. This may be used to correct a color distortion introduced at the end of the stroke.

The color filter 86 is preferably dimensioned to contain four rainbow bands 39 in association with three vertical stripes of similar width in the pattern on the picture screen, to allow for the transverse movement of the color filter and maintain full coverage over the picture screen regardless of the position of the color filter.

Figure 16:
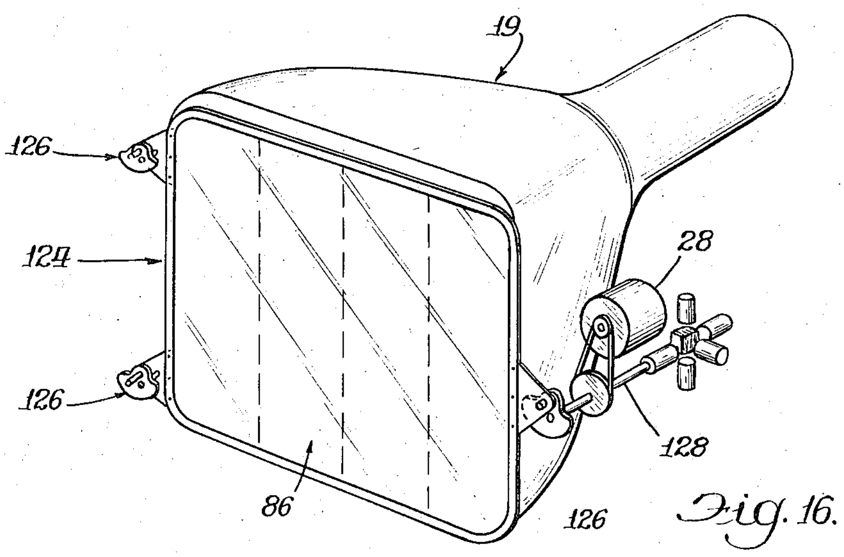
FIG. 16 is a perspective view of another modified form of device.

While the form represented in FIG. 15 produces only oscillatory or reciprocatory movement, this component of movement can be incorporated in an orbiting movement. A modified form of device for producing such oribiting movement is shown in FIG. 16 where the color filter 124, similar to the color filter 86, is mounted on a plurality of counter weighted cranks 126 one of which 126*a*, is driven through a shaft 128 in turn driven by the motor 28. The same phase shifter 30 described above may be utilized here, and it is of course driven in synchronism with the color filter.

In the present form of the device, the oscillatory or reciprocatory component of movement is incorporated; the vertical component of movement that is necessarily present in an orbiting path, however is not apparent, and it does not affect the registration of the color filter with the pattern on the picture screen.

In both cases, FIGS. 15 and 16, the color filter moves basically in a sinusoidal movement, the rate thereof being lesser at the ends and greater at the middle. This is not such a detraction as may be supposed because the greater portion of the movement of the color filter, in the middle portion of its movement, is very close to uniform rectilinear movement, and that lesser portion at the ends is not only lesser in extent but accompanied by the blanking out in the stroboscopic illumination of the picture screen field so that at the ends of the range of movement of the color filter, the extent of the movement in that portion that is of the lower rate is so small that it does not materially detract from the registration of the color filter and pattern at those portions. Nevertheless, the possible imperfections in registration at those end portions may be overcome by the use of the arrangement illustrated in FIG. 17 where the color filter 86 (or 124) is drawn in one direction (retracting) by an electromagnet 130 and advanced by a spring 132, the latter movement at a rate in synchronism with the pattern on the picture screen, the spring being selected for that purpose, as to strength and effective operating portion of its range of elasticity.

Figure 17:
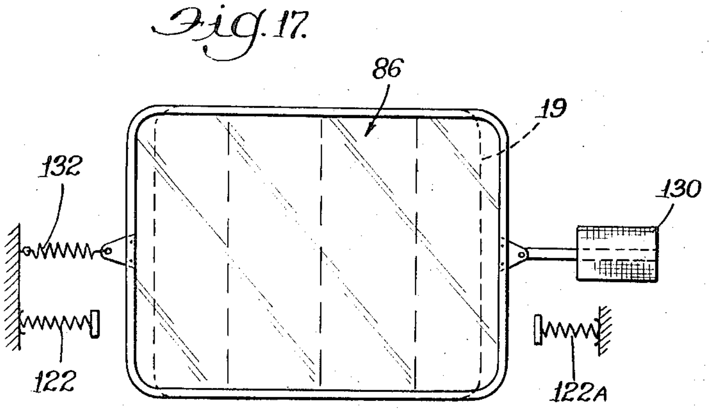
FIG. 17 is a face view of still another modified form.

In the modifications of FIGS. 15, 16 and 17, as in the case of the first form of the invention, the color filter moves uniformly throughout its area, i.e., all portions move the same amount, at the same rate of speed and in the same direction, and again in contrast to a rotating disc where the rim velocity is greater than that of the inner portions.

The devices of FIGS. 15, 16 and 17 provide an advantage in their compactness, particularly in that the color filter is nearly the same size as the picture screen of the tube, and it does not involve a belt completely surrounding the picture tube or any other major component of the receiving set.

The parallax condition is a direct result of the relation between the width of the color bands on the color filter and the depth of the front element 20 of the picture tube, i.e., the distance between the color filter and the picture screen 21. On a picture tube of larger size, for example a 21-inch screen, the glass is on the order of five-eighths inch in thickness. An extreme example of side angle viewing would be 45 degrees and this would be a serious or extreme angle in the case of narrow color bands and stripes. Theoretically, the greater the number of color bands there are, the slower the belt surface speed can be made with less chance of noise, but if the number is too great, the parallax would be too serious and it is believed that a practical maximum would be three rainbow bands across the screen, nine color bands in all. With this number of elements (rainbow bands or color bands) an optimum compromise is attained as between the greater number of bands and a minimum of parallax effect. A screen known as 21-inch screen is about 19 inches wide and dividing this distance by nine, each color band is substantially 2.11 inches wide. In the use of color bands of this width in conjunction with a picture tube element of five-eighths inch thickness, parallax is a relatively minor effect.

The linear speed of the color filter 22 across the front of the picture tube depends of course on the size of the picture tube for any given rate of change of the field of colors in the color filter. An example of a desired rate is 20 rainbow bands of three colors each per second so that each rainbow band would be, in the case of three rainbow bands across the screen, in the viewing area for an interval of three-twentieth second. The linear speed is then the inches of screen width times 20/3, or the reciprocal of the time interval, inches per second, and dividing by 12 of course provides feet per second.

Figure 14:
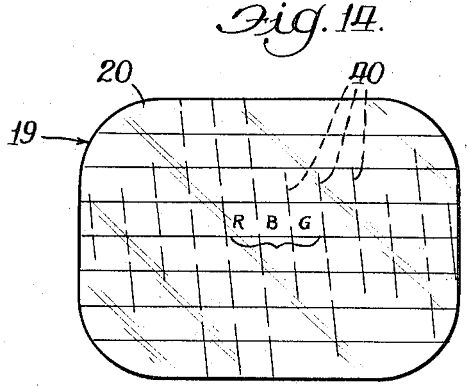
FIG. 14 is a face view of a picture tube showing apparent angular disposition of color stripes on the picture screen.

In the change of the colors on the picture screen, each horizontal line is made up of the different colors in the establishment of that line. The successive lines follow the progression of the vertical color stripes across the screen so that each line, while following the same order of colors of the preceding line, and in near identity to them, is slightly offset because of the progression horizontally of the screen, and therefore the vertical color peak intensity stripes would appear to the viewer, if he were aware of them, as slightly oblique through the filter, as represented in FIG. 14.

Another great advantage of the invention will now be apparent,—all portions of the filter move at the same effective speed, and there is no objectionable higher rim velocity as in the case of revolving color discs.

The drive motor 28 is nominally a synchronous motor but it need not be accurately so, a substantial variation in this respect being permissible, although preferably it is of uniform speed. Whatever the speed of the motor is, the phase shifter 30 will be in register or synchronism with the color filter, and thus perfect registration or synchronism is established as between the color filter and the color stripes on the picture screen. The motor speed must be converted by the intervening drive means to move the filter belt at a particular steady rate which brings the colors at any given spot on the screen into stroboscopic illumination at such color phase angle as to complete a color sequence. A completed sequence is such that with equal illumination or full intensity of luminance of all basic additive colors the spot would appear white. There is no requirement for synchronism as between the vertical scan and the movement of the color filter. There is no control exerted on the color filter by the broadcast signals, either in the broadcasting station or the receiving set, and in fact the selection of broadcast signals is controlled by the apparatus of this invention, that is applied to the receiving set.

I claim:

1. Apparatus of the character disclosed for producing color TV, comprising, a receiving set including a picture screen and adapted to receive color information signals from a transmitting station and present them in monochrome appearance on the picture screen in a system including a plurality of horizontal scanning lines, means for arranging such signals on the picture screen in a pattern of different color information representing one color in each of a plurality of horizontally spaced vertical stripes of substantial width, a color filter and means mounting it with a run of single thickness across the front of the picture screen, the color filter having color bands of substantially the same colors and in the same order as in the pattern of color information in said vertical stripes and in areas respectively in registration with those vertical stripes, and common driving means in the receiving set independent of the transmitting station for moving the color stripes horizontally across the screen and moving the color filter correspondingly therewith, with the color bands continuously in registration with respective color stripes.

2. The invention set out in claim 1 wherein the colors on the picture screen include high intensity portions and lesser intensity portions therebetween mutually blending with adjacent colors.

3. The invention set out in claim 1 wherein the receiving set includes a picture tube having a front element on the inner surface of which the color information is presented for viewing, the color filter is in the form of a continuous belt having a single portion disposed in front of the picture tube, and the continuous belt and pattern are moved continuously in the same direction.

4. The invention set out in claim 3 wherein proximate portions of adjacent colors are at least partially overlaid, effecting a continuous transition between adjacent colors, the colors being such that at substantially equivalent brightness they add to white light.

5. The invention set out in claim 1 wherein each of the areas of the colors in the color filter has a central portion of maximum intensity and side portions of progressively diminishing intensity extending outwardly therefrom.

6. The invention set out in claim 5 wherein the color filter includes a linear web having a plurality of superposed layers, each layer including a succession, linearly of the web, of color bands extending the full width of the web and of the same colors as the color information of the TV signals, and all layers including the same order of succession of the colors, and the successive layers being offset linearly of the web a fraction of the width of the individual colors.

7. The invention set out in claim 6 wherein the successive layers in the web are offset an amount equal to that fraction of the width of a color band which is substantially the reciprocal of the number of layers.

8. The invention set out in claim 1 wherein each such scanning line includes the color information of all of said colors across the picture screen, and each scanning line is of colors along its length nearly identical with the colors of the preceding scanning line and of the same extent whereby to produce color information stripes of substantial uniform width extending across the picture screen transverse to the scanning lines.

9. The invention set out in claim 1 wherein the color filter is in the form of an endless belt surrounding the picture tube, and wherein the color bands in the color filter and the stripes of color information on the picture screen are arranged in three different colors which at equivalent intensity add to white lights, three adjacent color bands on the color filter constituting a rainbow band, and the dimensions of the bands are such that the width of the picture screen is equivalent to a plurality of rainbow bands.

10. The invention set out in claim 1 and including color bar generator means which itself includes a crystal having a frequency slightly different from the frequency of the transmitted TV signals, the color bar generator means thereby producing the color information on the picture screen in the form of said vertical stripes, a phase shifter controlling the output of said crystal and operative for effecting movement of the vertical stripes across the picture screen, said common driving means operating the phase shifter and moving the color filter together in register.

11. The invention set out in claim 10 wherein the phase shifter includes transformer coils in circuit with the crystal and operative for controlling the output thereof, a rotor operatively associated with the transformer coils and operative upon rotation thereof for varying the induction of the transformer coils and thereby operative for producing movement of the color information stripes across the picture screen, said common driving means operating the rotor and moving the color filter together in synchronism.

12. The invention set out in claim 11 wherein the rotor includes a transformer coil.

13. The invention set out in claim 11 wherein each transformer coil includes a normally saturating first magnet means, and the rotor includes magnet means operative for neutralizing the first magnet means successively in the transformer coils.

14. The invention set out in claim 11 wherein the transformer coils are differentially gated, and the transformer coils and rotor are so constructed and arranged that as the inductance of each transformer coil decreases, that of the next transformer coil increases, thereby changing the phase angle continuously throughout full circle travel of the rotor.

15. The invention set out in claim 1 wherein the color filter is in the form of a panel disposed in front of the picture screen and is moved in alternately reverse directions.

16. The invention set out in claim 15 wherein the color filter is moved in oscillatory manner.

17. The invention set out in claim 16 wherein the pattern on the picture screen is also moved in oscillatory manner.

18. The invention set out in claim 15 wherein the color filter is moved in orbiting manner.

19. TV apparatus having a picture screen, means for producing a color information pattern on the picture screen, a color filter having a color pattern similar to the pattern of color information on the picture screen, and having a single sheet disposed in front of the picture screen, a phase angle shifter for moving the color information pattern across the picture screen, and a common motor for actuating the phase angle shifter for correspondingly moving the pattern on the picture screen as stated, and operative for moving the filter across the picture screen simultaneously with and at the same rate as the movement of color information pattern, whereby to maintain the pattern on the picture screen and the filter in register with each other.

20. The invention set out in claim 19 wherein each pattern includes vertically disposed bands/stripes of a plurality of colors with peak intensity color at each band/stripe and areas of lesser intensitites and mixtures therebetween, the peak intensity color portions of the two patterns being in substantial registration.

21. A method of producing color TV reception in a TV set having a picture screen, utilized in presenting a picture on the picture screen, comprising the steps, imposing signals of different color information in a single field in horizontal scanning lines and in a plurality of vertical stripes of substantial width on the picture screen, filtering said stripes by utilizing the same colors represented on the picture screen, changing the color information and filter colors in all the stripes between stroboscopic illuminations simultaneously, and including the further step of moving the color information stripes and filter colors in alternately opposite direcions.

* * * * *